(12) United States Patent
Bi et al.

(10) Patent No.: US 11,212,755 B2
(45) Date of Patent: Dec. 28, 2021

(54) MAXIMUM TRANSMISSION POWER DETERMINING METHOD, APPARATUS, SYSTEM, AND STORAGE MEDIUM

(71) Applicant: Huawei Technologies Co., Ltd., Shenzhen (CN)

(72) Inventors: Wenping Bi, Shenzhen (CN); Zhiheng Guo, Beijing (CN); Yi Long, Beijing (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/993,039

(22) Filed: Aug. 13, 2020

(65) Prior Publication Data

US 2020/0374815 A1 Nov. 26, 2020

Related U.S. Application Data

(63) Continuation of application No. PCT/CN2018/076875, filed on Feb. 14, 2018.

(51) Int. Cl.
*H04W 52/34* (2009.01)
*H04W 52/14* (2009.01)

(52) U.S. Cl.
CPC ......... *H04W 52/34* (2013.01); *H04W 52/146* (2013.01)

(58) Field of Classification Search
CPC .... H04W 52/34; H04W 52/146; H04W 52/30
See application file for complete search history.

(56) References Cited

U.S. PATENT DOCUMENTS

| 2015/0271765 A1 | 9/2015 | Hakola et al. |
| 2016/0029239 A1* | 1/2016 | Sadeghi ............... H04W 24/10 370/252 |
| 2016/0205631 A1* | 7/2016 | Chen .................. H04W 52/146 455/522 |

FOREIGN PATENT DOCUMENTS

| CN | 104349443 A | 2/2015 |
| CN | 105637944 A | 6/2016 |
| CN | 105940733 A | 9/2016 |
| CN | 106031256 A | 10/2016 |
| CN | 106031257 A | 10/2016 |
| CN | 106165501 A | 11/2016 |
| CN | 106576304 A | 4/2017 |

(Continued)

OTHER PUBLICATIONS

3rd Generation Partnership Project; Technical Specification Group Radio Access Network; NR;Radio Resource Control (RRC) protocol specification (Release 15), 3GPP TS 38.331 V15.0.0 (Dec. 2017), 188 pages.

(Continued)

*Primary Examiner* — Kabir A Timory
(74) *Attorney, Agent, or Firm* — Slater Matsil, LLP

(57) ABSTRACT

Embodiments of this application provide a maximum transmission power determining method, an apparatus, a system, and a storage medium. A network device configures, for a terminal device that works in a DC mode but does not support dynamic power sharing, power information corresponding to a first time unit and power information corresponding to a second time unit when a first radio access technology is used, and correspondingly, the terminal device determines maximum transmission power corresponding to the first time unit and maximum transmission power corresponding to the second time unit.

20 Claims, 6 Drawing Sheets

(56) References Cited

FOREIGN PATENT DOCUMENTS

| CN | 107113740 A | 8/2017 |
|---|---|---|
| WO | 2013062388 A2 | 5/2013 |
| WO | 2014190543 A1 | 12/2014 |

OTHER PUBLICATIONS

3rd Generation Partnership Project; Technical Specification Group Radio Access Network; NR; Physical layer procedures for control (Release 15), 3GPP TS 38.213 V15.0.0 (Dec. 2017), 56 pages.

3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.0.1 (Jan. 2018), 776 pages.

3rd Generation Partnership Project; Technical Specification Group Radio Access Network; NR; User Equipment (UE) radio transmission and reception; Part 3: Range 1 and Range 2 Interworking operation with other radios (Release 15), 3GPP TS 38.101-3 V15.0.0 (Dec. 2017), 23 pages.

Ericsson, "Power Sharing for LTE-NR Dual connectivity", 3GPP TSG-RAN WG1 #90, R1-1714460, Prague, Czech Republic, Aug. 21-25, 2017, 3 pages.

Huawei et al., "Power control for CA and DC", 3GPP TSG RAN WG1 Meeting 90bis, R1-1717312, Prague, Czech Republic, Oct. 9-13, 2017, 5 pages.

LG Electronics, "Discussion on dynamic power sharing with sTTI for DC", 3GPP TSG RAN WG1 NR AH1801, R1-1800392 , Vancouver, Canada, Jan. 22-26, 2018, 4 pages.

Ericsson et al., "TP for LTE-NR power sharing", 3GPP TSG-RAN WG1 AH 1801, R1-1801270, Vancouver, Canada, Jan. 22-26, 2018, 4 pages.

\* cited by examiner

MAXIMUM TRANSMISSION POWER DETERMINING METHOD, APPARATUS, SYSTEM, AND STORAGE MEDIUM

CROSS-REFERENCE TO RELATED APPLICATIONS

This application is a continuation of International Application No. PCT/CN2018/076875, filed on Feb. 14, 2018, the disclosure of which is hereby incorporated by reference in its entirety.

TECHNICAL FIELD

This application relates to wireless communications technologies, and in particular, to a maximum transmission power determining method, an apparatus, a system, and a storage medium.

BACKGROUND

With continuous development and evolution of wireless communications technologies, the fifth-generation mobile communications network (5G) emerges. In 5G, a working mode of a terminal device includes a dual connectivity (DC) mode. The DC mode means that the terminal device may access a network via two radio access technologies at the same time. For example, the two radio access technologies may be a new radio (NR) technology and a long term evolution (LTE) technology, or may be other radio access technologies such as a universal mobile telecommunications system (UMTS) technology and a global system for mobile communications (GSM) technology, or may be a combination of any two thereof. This is not limited herein.

For example, the two radio access technologies are the LTE technology and the NR technology. In the DC mode, the terminal device may concurrently send uplink signals to an LTE base station and an NR base station. Considering that a transmission capability of the terminal device is limited, it needs to be ensured that transmission power of the terminal device does not exceed the transmission capability of the terminal device. Therefore, the terminal device needs to perform power sharing on an LTE side and an NR side. For a terminal device that does not support dynamic power sharing, the prior art has the following solutions:

Solution 1: The terminal device sends uplink signals to the LTE base station and the NR base station in a time division multiplexing (TDM) manner.

Solution 2: The LTE base station separately configures maximum transmission power $P_{LTE}$ on the LTE side and maximum transmission power $P_{NR}$ on the NR side for the terminal device, and $P_{LTE}+P_{NR} \leq P_{cmax}$, where $P_{cmax}$ represents a transmission capability of the terminal device.

However, in the foregoing solutions, flexibility of a wireless communications system is relatively poor.

SUMMARY

This application provides a maximum transmission power determining method, an apparatus, a system, and a storage medium, to improve flexibility of a wireless communications system for a terminal device that works in a DC mode but does not support dynamic power sharing.

According to a first aspect, an embodiment of this application provides a maximum transmission power determining method, including: receiving, by a terminal device, power information sent by a network device, where the power information includes first power information and second power information; and determining, by the terminal device, first maximum transmission power based on the first power information, and determining second maximum transmission power based on the second power information; or determining, by the terminal device, first maximum transmission power based on the first power information, and determining second maximum transmission power based on the first power information and the second power information.

The first maximum transmission power is maximum transmission power used when the terminal device sends information to the network device in a first time unit via a first radio access technology, and the second maximum transmission power is maximum transmission power used when the terminal device sends information to the network device in a second time unit via the first radio access technology.

The terminal device receives the power information that is sent by the network device and that includes the first power information and the second power information, and then determines the first maximum transmission power based on the first power information, and determines the second maximum transmission power based on the second power information, or determines the first maximum transmission power based on the first power information, and determines the second maximum transmission power based on the first power information and the second power information. The first maximum transmission power is the maximum transmission power used when the terminal device sends information to the network device in the first time unit via the first radio access technology, and the second maximum transmission power is the maximum transmission power used when the terminal device sends information to the network device in the second time unit via the first radio access technology. In this way, the network device configures, for a terminal device that works in a DC mode but does not support dynamic power sharing, the power information corresponding to the first time unit and the power information corresponding to the second time unit when the first radio access technology is used, and correspondingly, the terminal device determines the maximum transmission power corresponding to the first time unit and the maximum transmission power corresponding to the second time unit. Compared with the prior art in which one piece of maximum transmission power is used for all time units, this embodiment of this application can improve flexibility of a wireless communications system.

In a possible implementation, the maximum transmission power determining method may further include: receiving, by the terminal device, first indication information sent by the network device, where the first indication information indicates a first time unit set and a second time unit set, the first time unit set may include the first time unit, and the second time unit set may include the second time unit.

In this implementation, the network device explicitly indicates the first time unit set and the second time unit set to the terminal device via the first indication information. The first time unit set includes the first time unit, and the second time unit set includes the second time unit, to notify the terminal device to separately use the time units corresponding to the first maximum transmission power and the second maximum transmission power.

In a possible implementation, the maximum transmission power determining method may further include: determining, by the terminal device based on the first maximum transmission power, first transmission power for sending information to the network device in the first time unit via the first radio access technology; and determining, based on the second maximum transmission power, second transmission power for sending information to the network device in the second time unit via the first radio access technology. Then, the terminal device may send an uplink signal to the network device in the first time unit at the first transmission power via the first radio access technology, and send an uplink signal to the network device in the second time unit at the second transmission power via the first radio access technology.

In a possible implementation, the maximum transmission power determining method may further include: receiving, by the terminal device, second indication information sent by the network device, where the second indication information indicates a third time unit set, and the third time unit set may include the second time unit.

In this implementation, the network device explicitly indicates the third time unit set to the terminal device via the second indication information. The third time unit set includes the second time unit, to notify the terminal device to use the time unit corresponding to the second maximum transmission power.

In a possible implementation, the maximum transmission power determining method may further include: determining, by the terminal device based on the second maximum transmission power, third transmission power for sending information to the network device in the third time unit set via the first radio access technology; and determining, based on the first maximum transmission power, fourth transmission power for sending information to the network device in a fourth time unit set via the first radio access technology, where the fourth time unit set includes the first time unit. Then, the terminal device may send an uplink signal to the network device in the first time unit at the fourth transmission power via the first radio access technology, and send an uplink signal to the network device in the second time unit at the third transmission power via the first radio access technology.

The second indication information explicitly indicates only the third time unit set to the terminal device, and a function of the third time unit set is the same as that of the second time unit set in the first indication information. The fourth time unit set corresponding to the first time unit set in the first indication information is determined by the terminal device based on the third time unit set, but is not indicated by the second indication information.

In a possible implementation, the maximum transmission power determining method may further include: in an uplink scheduling time unit of the first radio access technology, if a transmission direction in which the terminal device receives/sends information via a second radio access technology is a downlink direction, determining, by the terminal device based on the first maximum transmission power, transmission power used when the terminal device sends information to the network device via the first radio access technology.

In a possible implementation, the maximum transmission power determining method may further include: in an uplink scheduling time unit of the first radio access technology, if transmission directions in which the terminal device receives and/or sends information via the second radio access technology include an uplink direction, determining, by the terminal device based on the second maximum transmission power, transmission power used when the terminal device sends information to the network device via the first radio access technology.

When the uplink scheduling time unit of the first radio access technology completely overlaps a downlink scheduling time unit of the second radio access technology, power used when the terminal device sends information via the first radio access technology can reach a transmission capability of the terminal device. Transmission directions in which the terminal device receives and sends information via the second radio access technology are distinguished, to configure, for the terminal device, maximum transmission power used when the terminal device sends information via the first radio access technology, so that transmission power of the terminal device is more fully used when the transmission power of the terminal device does not exceed the transmission capability of the terminal device. To be specific, during non-simultaneous uplink sending, transmission power used when the terminal device sends information to the network device via the first radio access technology may be higher, thereby improving a coverage area and/or a throughput of a wireless communications system.

According to a second aspect, an embodiment of this application provides a maximum transmission power determining method, including: determining, by a network device, power information; and sending, by the network device, the power information to a terminal device, where the power information includes first power information and second power information; the first power information indicates the terminal device to determine first maximum transmission power, and the second power information indicates the terminal device to determine second maximum transmission power, or the first power information and the second power information jointly indicate the terminal device to determine second maximum transmission power; and the first maximum transmission power is maximum transmission power used when the terminal device sends information to the network device in a first time unit via a first radio access technology, and the second maximum transmission power is maximum transmission power used when the terminal device sends information to the network device in a second time unit via the first radio access technology.

The network device sends the power information that includes the first power information and the second power information to the terminal device, so that the terminal device determines the first maximum transmission power based on the first power information, and determines the second maximum transmission power based on the second power information, or determines the first maximum transmission power based on the first power information, and determines the second maximum transmission power based on the first power information and the second power information. The first maximum transmission power is the maximum transmission power used when the terminal device sends information to the network device in the first time unit via the first radio access technology, and the second maximum transmission power is the maximum transmission power used when the terminal device sends information to the network device in the second time unit via the first radio access technology. In this way, the network device configures, for a terminal device that works in a DC mode but does not support dynamic power sharing, the power information corresponding to the first time unit and the power information corresponding to the second time unit when the first radio access technology is used, and correspondingly, the terminal device determines the maximum transmission power corresponding to the first time unit and the maximum transmission power corresponding to the second time unit. Compared with the prior art in which one piece of maximum transmission power is used for all time units, this embodiment of this application can improve flexibility of a wireless communications system.

In a possible implementation, the maximum transmission power determining method may further include: sending, by the network device, first indication information to the terminal device, where the first indication information indicates a first time unit set and a second time unit set, the first time unit set includes the first time unit, and the second time unit set includes the second time unit.

In this implementation, the network device explicitly indicates the first time unit set and the second time unit set to the terminal device via the first indication information. The first time unit set includes the first time unit, and the second time unit set includes the second time unit, to notify the terminal device to separately use the time units corresponding to the first maximum transmission power and the second maximum transmission power.

In a possible implementation, the maximum transmission power determining method may further include: sending, by the network device, second indication information to the terminal device, where the second indication information indicates a third time unit set, and the third time unit set includes the second time unit.

In this implementation, the network device explicitly indicates the third time unit set to the terminal device via the second indication information. The third time unit set includes the second time unit, to notify the terminal device to use the time unit corresponding to the second maximum transmission power.

In a possible implementation, in an uplink scheduling time unit of the first radio access technology, if a transmission direction in which the terminal device receives/sends information via a second radio access technology is a downlink direction, the first power information further indicates the terminal device to determine, based on the first maximum transmission power, transmission power used when the terminal device sends information to the network device via the first radio access technology; and in an uplink scheduling time unit of the first radio access technology, if transmission directions in which the terminal device receives and/or sends information via the second radio access technology include an uplink direction, the second power information further indicates the terminal device to determine, based on the second maximum transmission power, transmission power used when the terminal device sends information to the network device via the first radio access technology.

In a possible implementation, in an uplink scheduling time unit of the first radio access technology, if a transmission direction in which the terminal device receives/sends information via a second radio access technology is a downlink direction, the first power information further indicates the terminal device to determine, based on the first maximum transmission power, transmission power used when the terminal device sends information to the network device via the first radio access technology; and in an uplink scheduling time unit of the first radio access technology, if transmission directions in which the terminal device receives and/or sends information via the second radio access technology include an uplink direction, the first power information and the second power information further jointly indicate the terminal device to determine, based on the first maximum transmission power and the second maximum transmission power, transmission power used when the terminal device sends information to the network device via the first radio access technology.

When the uplink scheduling time unit of the first radio access technology completely overlaps a downlink scheduling time unit of the second radio access technology, power used when the terminal device sends information via the first radio access technology can reach a transmission capability of the terminal device. Transmission directions in which the terminal device receives and sends information via the second radio access technology are distinguished, to configure, for the terminal device, maximum transmission power used when the terminal device sends information via the first radio access technology, so that transmission power of the terminal device is more fully used when the transmission power of the terminal device does not exceed the transmission capability of the terminal device. To be specific, during non-simultaneous uplink sending, transmission power used when the terminal device sends information to the network device via the first radio access technology may be higher, thereby improving a coverage area and/or a throughput of a wireless communications system.

According to a third aspect, an embodiment of this application provides a terminal device, including: a receiving module, configured to receive power information sent by a network device, where the power information includes first power information and second power information; and a processing module, configured to: determine first maximum transmission power based on the first power information, and determine second maximum transmission power based on the second power information; or determine first maximum transmission power based on the first power information, and determine second maximum transmission power based on the first power information and the second power information, where the first maximum transmission power is maximum transmission power used when the terminal device sends information to the network device in a first time unit via a first radio access technology, and the second maximum transmission power is maximum transmission power used when the terminal device sends information to the network device in a second time unit via the first radio access technology.

Based on a same inventive concept, a problem-resolving principle of the terminal device corresponds to the solutions in the method designs in the first aspect. Therefore, for implementation of the terminal device, refer to the implementation of the method. Details are not described again.

According to a fourth aspect, an embodiment of this application provides a network device, including a processing module, configured to determine power information; and a sending module, configured to send the power information to a terminal device, where the power information includes first power information and second power information, the first power information indicates the terminal device to determine first maximum transmission power, and the second power information indicates the terminal device to determine second maximum transmission power, or the first power information and the second power information jointly indicate the terminal device to determine second maximum transmission power; and the first maximum transmission power is maximum transmission power used when the terminal device sends information to the network device in a first time unit via a first radio access technology, and the second maximum transmission power is maximum transmission power used when the terminal device sends information to the network device in a second time unit via the first radio access technology.

Based on a same inventive concept, a problem-resolving principle of the network device corresponds to the solutions in the method designs in the second aspect. Therefore, for implementation of the network device, refer to the implementation of the method. Details are not described again.

According to a fifth aspect, an embodiment of this application provides a terminal device, including a processor and a memory. The memory is configured to store an instruction. When the processor executes the instruction stored in the memory, the terminal device is configured to perform the method in the first aspect.

According to a sixth aspect, an embodiment of this application provides a network device, including a processor and a memory. The memory is configured to store an instruction. When the processor executes the instruction stored in the memory, the network device is configured to perform the method in the second aspect.

According to a seventh aspect, an embodiment of this application provides a communications system, including the terminal device in the third aspect and the fifth aspect and the network device in the fourth aspect and the sixth aspect.

According to an eighth aspect, an embodiment of this application provides a computer-readable storage medium. When an instruction in the computer-readable storage medium is executed by a processor of a terminal device, the terminal device is enabled to perform the method in the first aspect.

According to a ninth aspect, an embodiment of this application provides a computer-readable storage medium. When an instruction in the computer-readable storage medium is executed by a processor of a network device, the network device is enabled to perform the method in the second aspect.

According to a tenth aspect, an embodiment of this application provides a terminal device, including at least one processing element (or chip) configured to perform the method in the first aspect.

According to an eleventh aspect, an embodiment of this application provides a network device, including at least one processing element (or chip) configured to perform the method in the second aspect.

According to a twelfth aspect, an embodiment of this application provides a program. When being executed by a processor of a terminal device, the program is used to perform the method in the first aspect.

According to a thirteenth aspect, an embodiment of this application provides a program. When being executed by a processor of a network device, the program is used to perform the method in the second aspect.

According to a fourteenth aspect, an embodiment of this application provides a computer program product, including the program in the twelfth aspect.

According to a fifteenth aspect, an embodiment of this application provides a computer program product, including the program in the thirteenth aspect.

According to a sixteenth aspect, an embodiment of this application provides a chip, including a processing module and a communications interface. The processing module can perform the method in the first aspect. Further, the chip further includes a storage module (for example, a memory), and the storage module is configured to store an instruction. The processing module is configured to execute the instruction stored in the storage module, and execution of the instruction stored in the storage module enables the processing module to perform the method in the first aspect.

According to a seventeenth aspect, an embodiment of this application provides a chip, including a processing module and a communications interface. The processing module can perform the method in the second aspect. Further, the chip further includes a storage module (for example, a memory), and the storage module is configured to store an instruction. The processing module is configured to execute the instruction stored in the storage module, and execution of the instruction stored in the storage module enables the processing module to perform the method in the second aspect. These aspects and other aspects in this application are clearer and more comprehensible in descriptions of the following (several) embodiments.

DETAILED DESCRIPTION OF ILLUSTRATIVE EMBODIMENTS

Figure 1:
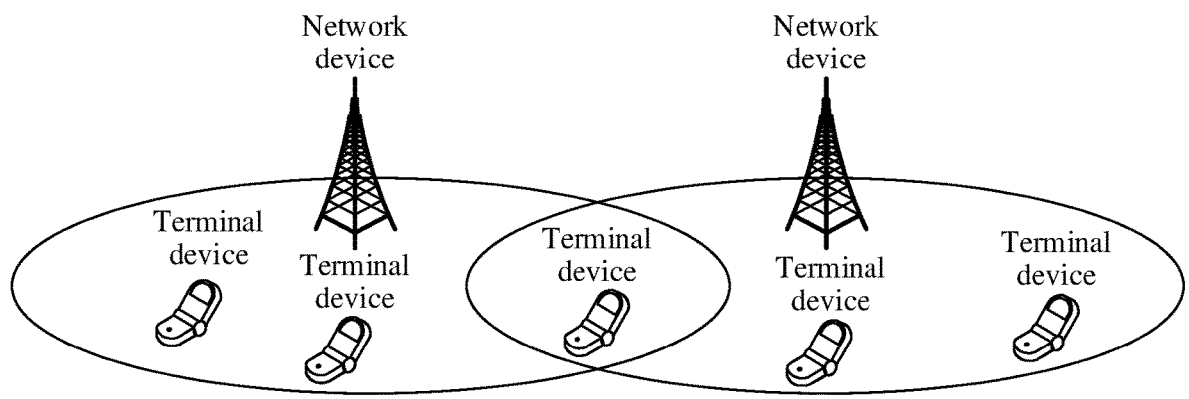
FIG. 1 is a schematic diagram of a communications system according to an embodiment of this application.

In an existing cellular communications system, such as a global system for mobile communications (GSM), a wideband code division multiple access (WCDMA) mobile communications system, or a long term evolution (LTE) system, supported communication is mainly for voice and data communication. Usually, a conventional base station (BS) supports a limited quantity of connections, and is easy to implement. It should be noted that, in LTE (4G, fourth-generation mobile communications system), a base station may be referred to as an eNB (eNodeB, 4G base station, LTE base station); and in a next-generation (5G, fifth-generation) mobile communications system (also referred to as NR, New Radio), a base station may be referred to as a gNB (gNodeB, 5G base station, NR base station).

The next-generation mobile communications system not only supports conventional communication, but also supports that a terminal device works in a DC mode, to be specific, the terminal device may simultaneously work in two different communications systems, and the DC mode implements dual connectivity between different radio access technologies (RAT). A typical deployment manner is that NR is deployed on a 3.5 GHz carrier in time division duplex (TDD), and LTE is deployed on a 1.8 GHz carrier in frequency division duplex (FDD).

For example, two different communications systems are LTE and NR. Because schedulers of base stations on an LTE side and an NR side are independent, in the DC mode, the terminal device may simultaneously send uplink signals to the LTE base station and the NR base station based on two different RATs. The uplink signal usually includes a data signal, a control signal, and a measurement signal. The data signal is carried on a physical uplink shared channel (PUSCH), the control signal is carried on a physical uplink control channel (PUCCH), and the measurement signal includes a sounding reference signal (SRS).

Based on whether a terminal device can perform dynamic power sharing in the DC mode, there may be two types of terminal devices: 1. a terminal device that has a dynamic power sharing capability, and 2. a terminal device that does not have a dynamic power sharing capability. Herein, $P_{LTE}$ and $P_{NR}$ are respectively used to represent maximum uplink transmission power that is of a terminal device on the LTE side and that is configured by a network device for the terminal device and maximum uplink transmission power that is of the terminal device on the NR side and that is configured by the network device for the terminal device. The first type of terminal device, that is, the terminal device that can perform dynamic power sharing, can support a case in which a sum of $P_{LTE}$ and $P_{NR}$ that are configured is greater than $P_{cmax}$, in other words, the terminal device can process the case in which $P_{LTE}+P_{NR}>P_{cmax}$. However, the second type of terminal device, that is, the terminal device that does not support dynamic power sharing, cannot process the case in which $P_{LTE}+P_{NR}>P_{cmax}$.

Considering that a transmission capability of the terminal device is limited, it needs to be ensured that transmission power of the terminal device does not exceed the transmission capability of the terminal device. Therefore, for the second type of terminal device, current solutions are as follows:

In a first solution, the terminal device simultaneously sends uplink signals to the LTE base station and the NR base station in a TDM manner.

In a second solution, $P_{LTE}$ and $P_{NR}$ are separately configured, and $P_{LTE}+P_{NR} \leq P_{cmax}$. In this solution, only one piece of maximum transmission power is configured on each of the LTE side and the NR side.

For the first solution, the terminal device needs to send the uplink signals to the LTE base station and the NR base station in the TDM manner. This reduces scheduling flexibility of a wireless communications system. For example, the network device needs to perform synchronization between the LTE side and the NR side for the terminal device in the TDM manner.

For the second solution, all terminal devices that can work in the DC mode can support this solution, but maximum transmission power used when the terminal device receives/sends information via each of two RATs remains unchanged. For example, when the terminal device sends an uplink signal to the eNB, regardless of whether a direction of information transmission between the terminal device and the gNB is an uplink direction or a downlink direction, the maximum transmission power of the terminal device that is corresponding to the eNB is always $P_{LTE}$, and consequently flexibility of a wireless communications system is relatively poor.

Based on the foregoing problems, in a next-generation mobile communications system, when a terminal device does not support dynamic power sharing, especially when the terminal device does not use or support a TDM manner, embodiments of this application provide a maximum transmission power determining method, an apparatus, a system, and a storage medium. Specifically, the terminal device determines, based on power information sent by a network device, maximum transmission power corresponding to different time units, to improve flexibility of a wireless communications system.

FIG. 1 is a schematic diagram of a communications system according to an embodiment of this application. As shown in FIG. 1, the communications system includes a network device and at least one terminal device. The terminal device is within a coverage area of the network device, and communicates with the network device, to implement the following technical solutions provided in the embodiments of this application.

In the embodiments of this application, the embodiments are described with reference to a network device and a terminal device. The network device and the terminal device may work on a licensed band or a license-free band.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, a wearable device, a terminal device in a next-generation communications system such as a 5G network, a terminal device in a future evolved public land mobile network (PLMN), or a terminal device in an NR system.

As an example rather than a limitation, in the embodiments of this application, the terminal device may alternatively be a wearable device. The wearable device may also be referred to as a wearable intelligent device, and is a general term of wearable devices that are developed by intelligently designing daily wear via a wearable technology, for example, glasses, gloves, watches, clothes, and shoes. The wearable device is a portable device that is directly worn or integrated into clothes or accessories of a user. The wearable device is not only a hardware device, but also implements powerful functions through software support, data interaction, and cloud interaction. Generalized wearable intelligent devices include full-featured and large-size devices that can implement some or all functions without depending on smartphones, for example, smart watches or smart glasses, and devices that focus only on a specific type of application function and that need to work with other devices such as smartphones, for example, various smart bands or smart jewelry for vital sign monitoring.

In addition, the network device is also referred to as a radio access network (RAN) device, and is a device for connecting the terminal device to a wireless network. The network device may be an eNB in an LTE system, a relay station or an access point, a network device in a 5G network, a network device in a future evolved PLMN network, a new-generation base station gNB in an NR system, or the like. This is not limited herein.

Moreover, in the embodiments of this application, the network device serves a cell, and the terminal device communicates with the network device via a transmission resource (for example, a frequency domain resource or a spectrum resource) used in the cell. The cell may be a cell corresponding to the network device (for example, a base station), and the cell may be a macro base station or a base station corresponding to a small cell. The small cell herein may be a metro cell, a micro cell, a pico cell, a femto cell, or the like. These small cells are characterized by small coverage and low transmission power, and are applicable to providing a high-rate data transmission service.

Figure 2:
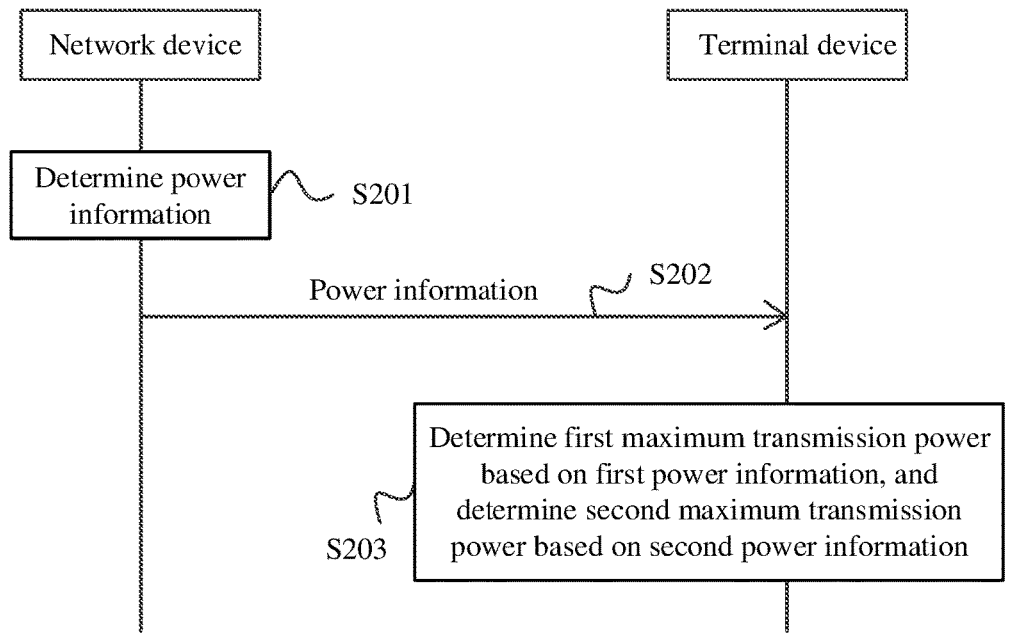
FIG. 2 is a signaling diagram of a maximum transmission power determining method according to an embodiment of this application.

FIG. 2 is a signaling diagram of a maximum transmission power determining method according to an embodiment of this application. The maximum transmission power determining method provided in this embodiment is applied to a terminal device and a network device. As shown in FIG. 2, the method in this embodiment includes the following steps.

S201. The network device determines power information.

During specific implementation, in a possible implementation, that the network device determines power information may include: The network device calculates, according to a preset rule based on quality of uplink channels corresponding to two radio access technologies (including a first radio access technology and a second radio access technology), minimum power required to ensure correct information transmission on a physical uplink control channel (PUCCH) corresponding to the first radio access technology, determines, based on the minimum power, maximum transmission power corresponding to the first radio access technology, and determines, based on a transmission capability limit of the terminal device, maximum transmission power corresponding to the second radio access technology.

For example, the first radio access technology is an LTE technology, and the second radio access technology is an NR technology. The network device calculates, according to a preset rule based on quality of uplink channels corresponding to the two radio access technologies, minimum power $P_{LTE,min}$ required to ensure correct information transmission on a PUCCH corresponding to the LTE technology, determines, based on the minimum power $P_{LTE,min}$, maximum transmission power $P_{LTE}$ corresponding to the first radio access technology, where $P_{LTE,min} \leq P_{LTE}$, and determines, based on a transmission capability limitation of the terminal device, maximum transmission power $P_{NR}=P_{cmax}-P_{LTE}$ corresponding to the NR technology.

The foregoing implementation is merely an example. Actually, the network device may determine the power information in a plurality of manners. This is not limited herein.

The power information includes first power information and second power information.

The first power information indicates the terminal device to determine first maximum transmission power, and the second power information indicates the terminal device to determine second maximum transmission power, or the first power information and the second power information jointly indicate the terminal device to determine second maximum transmission power. Therefore, a person skilled in the art may understand that the first maximum transmission power is determined based on the first power information, and the second maximum transmission power is determined based on the second power information, or the second maximum transmission power is jointly determined based on the first power information and the second power information.

The first maximum transmission power is maximum transmission power used when the terminal device sends information to the network device in a first time unit via a first radio access technology, and the second maximum transmission power is maximum transmission power used when the terminal device sends information to the network device in a second time unit via the first radio access technology. It may be understood that the first maximum transmission power is different from the second maximum transmission power. For example, the first maximum transmission power is greater than the second maximum transmission power, or the first maximum transmission power is less than the second maximum transmission power. In subsequent embodiments, an example in which the first maximum transmission power is greater than the second maximum transmission power is used for description.

As mentioned in the foregoing content, the embodiments of this application are applied to a terminal device that supports a DC mode but does not support dynamic power sharing, especially when the terminal device does not use or support a TDM manner. For the terminal device, the network device configures power information that includes first power information and second power information. In other words, the network device configures two pieces of power information: the first power information and the second power information for the terminal device that does not support dynamic power sharing, so that the terminal device determines maximum transmission power in different time units based on the power information. For details, refer to the description in S203.

Duration corresponding to the first time unit and duration corresponding to the second time unit may be the same or different.

S202. The network device sends the power information to the terminal device.

Correspondingly, the terminal device receives the power information sent by the network device.

It should be noted that the network device may send the power information to the terminal device via semi-statically configured higher layer signaling or other signaling. This is not limited herein. In other words, the power information is carried in the semi-statically configured higher layer signaling or other signaling. A specific type of the semi-statically configured higher layer signaling or other signaling, a specific existence form of the power information in the semi-statically configured higher layer signaling or other signaling, or the like is not limited in this embodiment of this application. In addition, a resource used by the network device to send the power information is not limited in this embodiment of this application either.

S203. The terminal device determines the first maximum transmission power based on the first power information, and determines the second maximum transmission power based on the second power information.

Alternatively, this step may be replaced with the following: The terminal device determines the first maximum transmission power based on the first power information, and determines the second maximum transmission power based on the first power information and the second power information.

Example 1

Maximum transmission power (the first maximum transmission power) used when the terminal device sends an uplink signal only to an LTE base station is determined based on the first power information. The first power information may be power information that is of the terminal device in a non-DC mode and that is configured by the LTE base station for the terminal device. In this case, the maximum transmission power (the first maximum transmission power) of the terminal device may be used on an LTE side, that is, $P_{LTE1} \leq P_{cmax}$. $P_{LTE1}$ is used to represent the first maximum transmission power. Maximum transmission power (the second maximum transmission power) that is configured by the LTE base station for the terminal device and that is used when the terminal device simultaneously sends uplink signals to the LTE station and an NR station is determined based on the second power information. $P_{LTE2}$ is used to represent the second maximum transmission power. In this example, $P_{LTE2}$ is less than or equal to $P_{LTE1}$.

Example 2

Maximum transmission power (the first maximum transmission power) used when the terminal device sends an uplink signal to only an LTE base station is determined based on the first power information. The first power information may be power information that is of the terminal device in a non-DC mode and that is configured by the LTE base station for the terminal device. In this case, the maximum transmission power (the first maximum transmission power) of the terminal device may be used on an LTE side, that is, $P_{LTE1} \leq P_{cmax}$. $P_{LTE1}$ is used to represent the first maximum transmission power. Maximum transmission power (the second maximum transmission power) that is configured by the LTE base station for the terminal device and that is used when the terminal device simultaneously sends uplink signals to the LTE station and an NR station is determined based on the second power information. For example, the second power information is set to a power ratio parameter a, where α is greater than or equal to 0, and a is less than or equal to 1. In this case, the determined second maximum transmission power is $P_{LTE2} = \alpha P_{LTE1}$. In this example, $P_{LTE2}$ is less than or equal to $P_{LTE1}$.

The foregoing example descriptions are merely for ease of understanding, and do not limit this embodiment of this application.

In this embodiment, the network device sends the power information that includes the first power information and the second power information to the terminal device, so that the terminal device determines the first maximum transmission power based on the first power information, and determines the second maximum transmission power based on the second power information, or determines the first maximum transmission power based on the first power information, and determines the second maximum transmission power based on the first power information and the second power information. The first maximum transmission power is the maximum transmission power used when the terminal device sends information to the network device in the first time unit via the first radio access technology, and the second maximum transmission power is the maximum transmission power used when the terminal device sends information to the network device in the second time unit via the first radio access technology. In this way, the network device configures, for a terminal device that works in a DC mode but does not support dynamic power sharing, the power information corresponding to the first time unit and the power information corresponding to the second time unit when the first radio access technology is used, and correspondingly, the terminal device determines the maximum transmission power corresponding to the first time unit and the maximum transmission power corresponding to the second time unit. Compared with the prior art in which one piece of maximum transmission power is used for all time units, this embodiment of this application can improve flexibility of a wireless communications system.

Figure 3A:
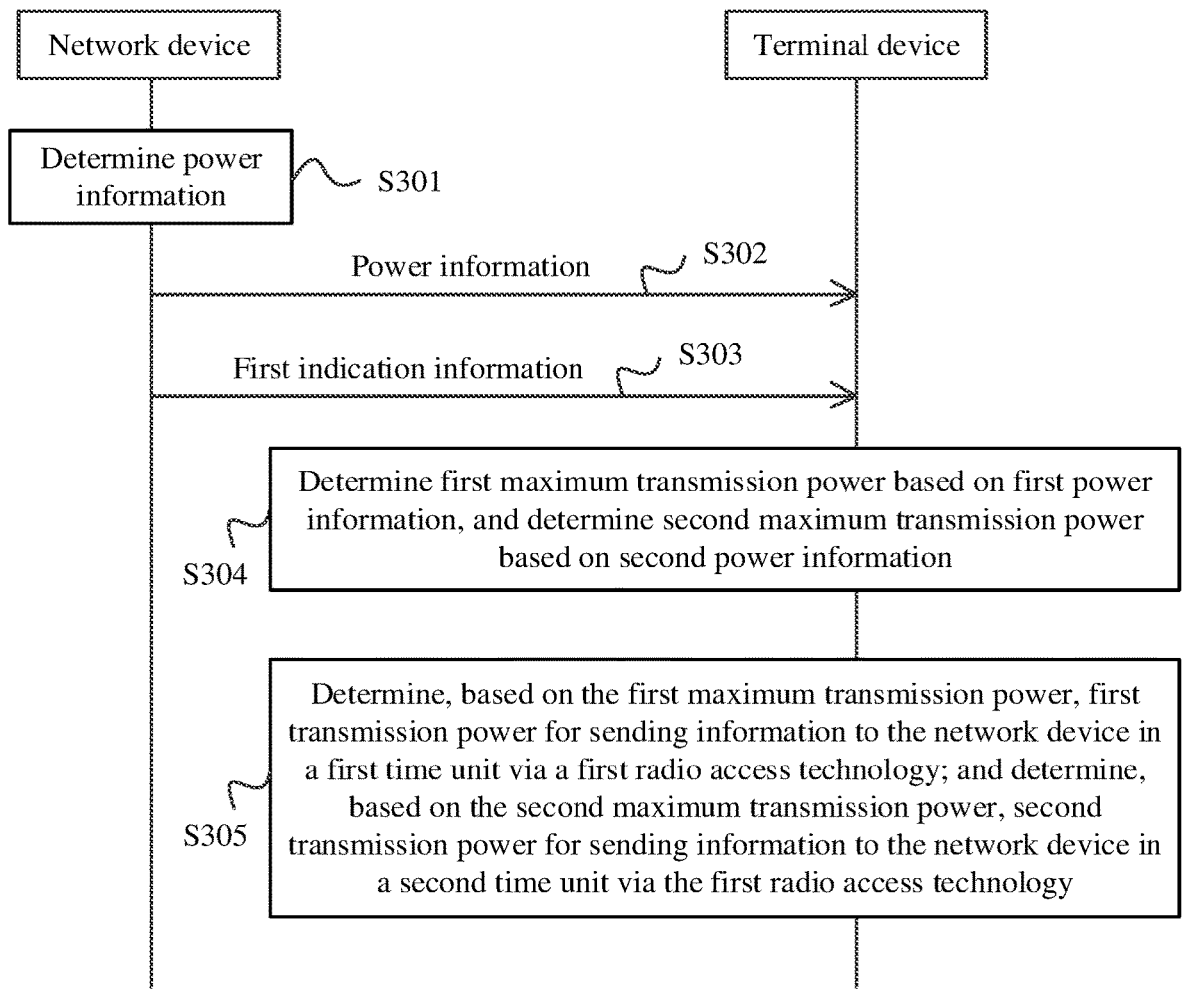
FIG. 3A is a signaling diagram of a maximum transmission power determining method according to another embodiment of this application.

FIG. 3A is a signaling diagram of a maximum transmission power determining method according to another embodiment of this application. As shown in FIG. 3A, the method in this embodiment may include the following steps.

S301. A network device determines power information.

This step is the same as S201, and details are not described herein again.

S302. The network device sends the power information to a terminal device.

This step is the same as 202, and details are not described herein again.

S303. The network device sends first indication information to the terminal device.

Correspondingly, the terminal device receives the first indication information sent by the network device.

The network device determines the first indication information. During specific implementation, in a possible implementation, that the network device determines the first indication information may include: determining the first indication information based on an uplink/downlink transmission direction on an NR side in a DC mode. For example, in an uplink scheduling time unit on an LTE side, for example, in a subframe, when the uplink/downlink transmission direction on the NR side is a downlink direction, the time unit on the LTE side is determined as a first time unit. In an uplink scheduling time unit on the LTE side, for example, in a subframe, when the uplink/downlink transmission direction on the NR side includes an uplink direction, that is, when the uplink scheduling time on the NR side at least partially overlaps the uplink scheduling time unit on the LTE side, the uplink scheduling unit on the LTE side is determined as a second time unit.

Specifically, the first indication information indicates a first time unit set and a second time unit set. The first time unit set includes the first time unit, and the second time unit set includes the second time unit.

Because the terminal device supports the DC mode, and may receive and send information via a first radio access technology and a second radio access technology at the same time. In this way, from a perspective of the terminal device, transmission directions in which information is received and sent via the first radio access technology and the second radio access technology may be distinguished in the following several scenarios:

Scenario 1: A transmission direction in which information is received/sent via the first radio access technology is an uplink direction, and a transmission direction in which information is received/sent via the second radio access technology is a downlink direction. In this scenario, in a process in which the terminal device sends information via the first radio access technology, the terminal device only receives information via the second radio access technology.

Scenario 2: A transmission direction in which information is received/sent via the first radio access technology is an uplink direction, and transmission directions in which information is received and/or sent via the second radio access technology include an uplink direction. In this scenario, in a process in which the terminal device sends an uplink signal via the first radio access technology, the terminal device further sends information via the second radio access technology. In other words, an uplink scheduling time unit of the first radio access technology at least partially overlaps an uplink scheduling time unit of the second radio access technology, and "at least partially overlap" may include "completely overlap".

For the foregoing two scenarios, it may be understood that, by distinguishing between the transmission directions in which information is received and sent via the first radio access technology and the second radio access technology, time units in which the terminal device sends an uplink signal via the first radio access technology include two parts: the first time unit and the second time unit. In the first time unit, a transmission direction in which the terminal device receives/sends information via the second radio access technology is a downlink direction. In this case, the first maximum transmission power may reach a transmission capability of the terminal device. In the second time unit, transmission directions in which the terminal device receives and/or sends information via the second radio access technology include an uplink direction. In this case, first maximum transmission power corresponding to the first time unit is greater than second maximum transmission power corresponding to the second time unit.

Figure 3B:
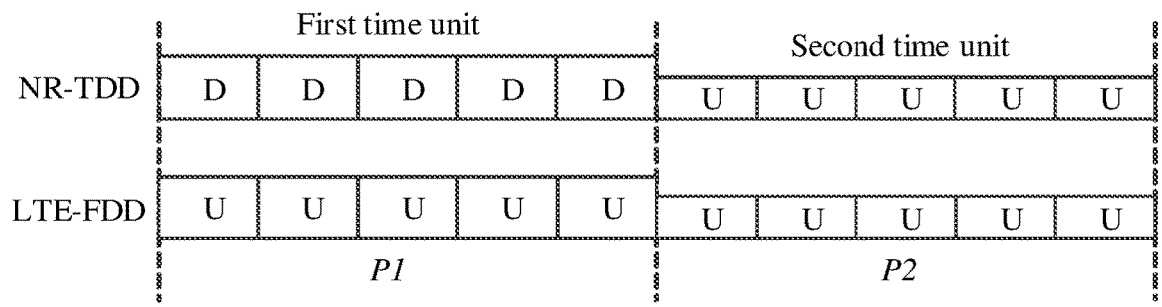
FIG. 3B is a diagram of an application example of a maximum transmission power determining method according to an embodiment of this application.

For example, the terminal device accesses a network via an LTE technology and an NR technology, and the first time unit and the second time unit each include four consecutive uplink scheduling time units. The uplink scheduling time unit is a most basic time unit in uplink scheduling. For example, the uplink scheduling time unit is a subframe (sub-frame). As shown in FIG. 3B, the first maximum transmission power corresponding to the first time unit is P1, the second maximum transmission power corresponding to the second time unit is P2, and P1 is greater than P2. NR is TDD, and LTE is FDD. This deployment form of NR and LTE is merely an example for description. This application is not limited thereto.

It should be noted that uplink scheduling time units included in the first time unit and/or uplink scheduling time units included in the second time unit may be consecutive or nonconsecutive. The foregoing example is merely for ease of understanding, and does not limit this application.

Optionally, the first time unit and the second time unit are time units of a same cell or time units of a same carrier.

In this embodiment of this application, maximum transmission power used when the terminal device sends information to the network device via the first radio access technology is determined. Therefore, a scenario in which a transmission direction in which the terminal device receives/sends information via the first radio access technology is a downlink direction is not considered herein.

The foregoing is merely an example of a relationship between the first time unit and the second time unit. This application is not limited thereto.

It should be noted that, for S303, a sequence of performing S303, S301, and S302 is not limited in this embodiment of this application. To be specific, the sequence of performing S301, S302, and S303 may be shown in FIG. 3A, or S303 may be performed before S301 and S302, or S301 is performed before S303 and S302. It may be understood that it needs to be ensured that S303 is performed before S304.

S304. The terminal device determines the first maximum transmission power based on the first power information, and determines the second maximum transmission power based on the second power information.

This step is the same as S203, and details are not described herein again.

This embodiment has at least the following beneficial effects.

The network device explicitly indicates the first time unit set and the second time unit set to the terminal device via the first indication information. The first time unit set includes the first time unit, and the second time unit set includes the second time unit, to notify the terminal device to separately use the time units corresponding to the first maximum transmission power and the second maximum transmission power. Therefore, this embodiment can improve flexibility of a wireless communications system.

In addition, because the first maximum transmission power corresponding to the first time unit is greater than the second maximum transmission power corresponding to the second time unit, this embodiment can further improve a coverage area and/or a throughput of the wireless communications system.

Moreover, because the first maximum transmission power corresponding to the first time unit can reach the transmission capability of the terminal device, the coverage area and/or the throughput of the wireless communications system are/is further improved.

Therefore, optionally, the maximum transmission power determining method may further include the following step.

S305. The terminal device determines, based on the first maximum transmission power, first transmission power for sending information to the network device in the first time unit via the first radio access technology, and determines, based on the second maximum transmission power, second transmission power for sending information to the network device in the second time unit via the first radio access technology.

After S305, the terminal device may send an uplink signal to the network device in the first time unit at the first transmission power via the first radio access technology, and send an uplink signal to the network device in the second time unit at the second transmission power via the first radio access technology.

Figure 4:
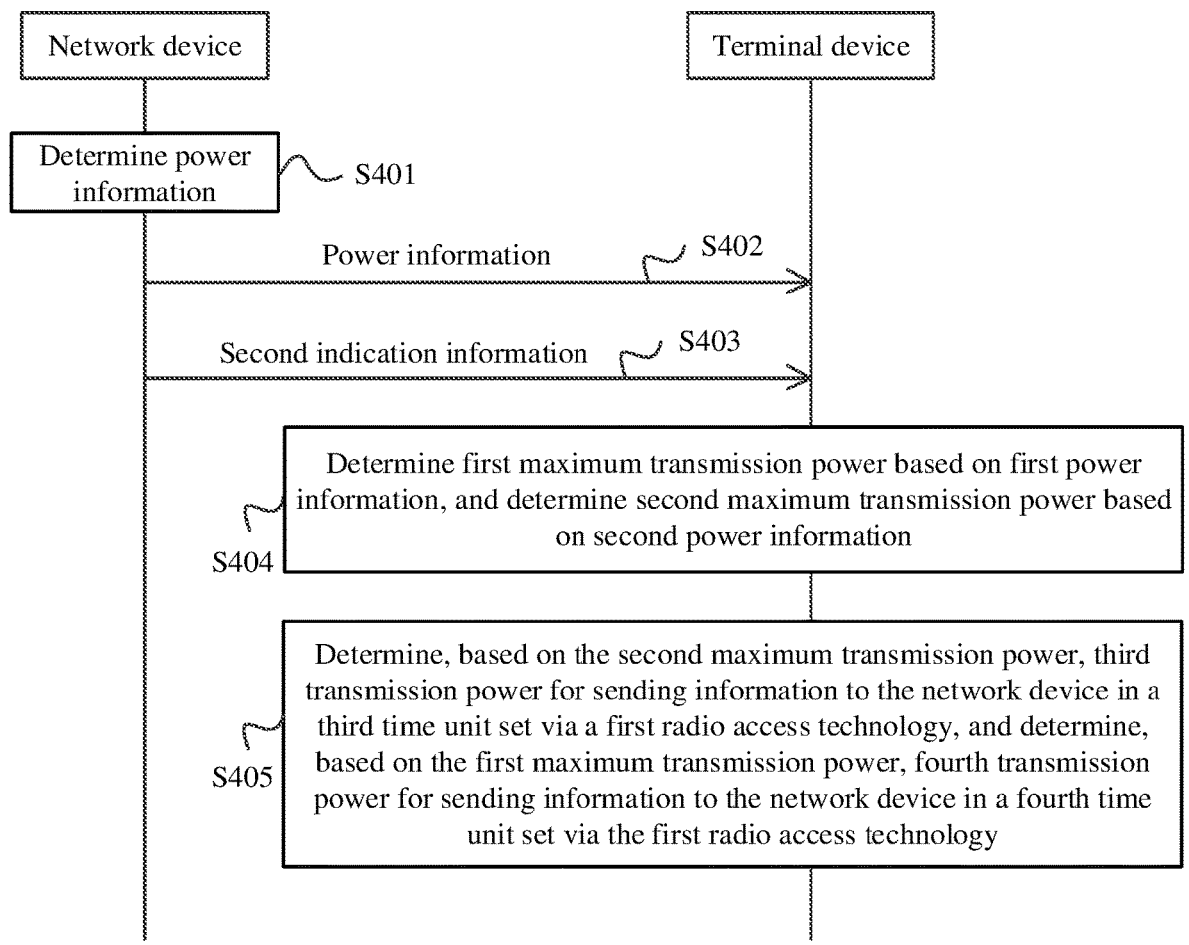
FIG. 4 is a signaling diagram of a maximum transmission power determining method according to still another embodiment of this application.

FIG. 4 is a signaling diagram of a maximum transmission power determining method according to still another embodiment of this application. As shown in FIG. 4, the method in this embodiment may include the following steps.

S401. A network device determines power information.

This step is the same as S201, and details are not described herein again.

S402. The network device sends the power information to a terminal device.

This step is the same as 202, and details are not described herein again.

S403. The network device sends second indication information to the terminal device.

Correspondingly, the terminal device receives the second indication information sent by the network device.

Specifically, the second indication information indicates a third time unit set, and the third time unit set includes a second time unit.

The network device determines the second indication information. During specific implementation, in a possible implementation, that the network device determines the second indication information may include: determining the second indication information based on an uplink/downlink transmission direction on an NR side in a DC mode. For example, in an uplink scheduling time unit on an LTE side, for example, in a subframe, when the uplink/downlink transmission direction on the NR side is an uplink direction, that is, when the uplink scheduling time on the NR side at least partially overlaps the uplink scheduling time unit on the LTE side, the uplink scheduling time unit on the LTE side is determined as a third time unit, and a time unit other than the uplink scheduling time unit on the LTE side is a fourth time unit.

Because the terminal device supports the DC mode, and may receive and send information via a first radio access technology and a second radio access technology at the same time. In this way, from a perspective of the terminal device, transmission directions in which information is received and sent via the first radio access technology and the second radio access technology may be distinguished in the following several scenarios.

Scenario 1: A transmission direction in which information is received/sent via the first radio access technology is an uplink direction, and a transmission direction in which information is received/sent via the second radio access technology is a downlink direction. In this scenario, in a process in which the terminal device sends information via the first radio access technology, the terminal device only receives information via the second radio access technology.

Scenario 2: A transmission direction in which information is received/sent via the first radio access technology is an uplink direction, and transmission directions in which information is received and/or sent via the second radio access technology include an uplink direction. In this scenario, in a process in which the terminal device sends an uplink signal via the first radio access technology, the terminal device further sends information via the second radio access technology. In other words, an uplink scheduling time unit of the first radio access technology at least partially overlaps an uplink scheduling time unit of the second radio access technology, and "at least partially overlap" may include "completely overlap".

For the foregoing two scenarios, it may be understood that, by distinguishing between the transmission directions in which information is received/sent via the first radio access technology and the second radio access technology, time units in which the terminal device sends an uplink signal via the first radio access technology include two parts: the first time unit and the second time unit. In the first time unit, a transmission direction in which the terminal device receives/sends information via the second radio access technology is a downlink direction. In this case, the first maximum transmission power may reach a transmission capability of the terminal device. In the second time unit, transmission directions in which the terminal device receives and/or sends information via the second radio access technology include an uplink direction. In this case, the first maximum transmission power corresponding to the first time unit is greater than second maximum transmission power corresponding to the second time unit, as shown in FIG. 3B.

In this embodiment of this application, maximum transmission power used when the terminal device sends information to the network device via the first radio access technology is determined. Therefore, a scenario in which a transmission direction in which the terminal device receives/sends information via the first radio access technology is a downlink direction is not considered herein.

The foregoing is merely an example of a relationship between the first time unit and the second time unit. This application is not limited thereto.

It should be noted that, for S403, a sequence of performing S403, S401, and S402 is not limited in this embodiment of this application. To be specific, the sequence of performing S401, S402, and S403 may be shown in FIG. 4, or S403 may be performed before S401 and S402, or S401 is performed before S403 and S402. It may be understood that it needs to be ensured that S403 is performed before S404.

S404. The terminal device determines the first maximum transmission power based on the first power information, and determines the second maximum transmission power based on the second power information.

This step is the same as S203, and details are not described herein again.

This embodiment has at least the following beneficial effects.

The network device explicitly indicates the third time unit set to the terminal device via the second indication information. The third time unit set includes the second time unit, to notify the terminal device to use the time unit corresponding to the second maximum transmission power. Therefore, this embodiment can improve flexibility of a wireless communications system.

In addition, because the first maximum transmission power corresponding to the first time unit is greater than the second maximum transmission power corresponding to the second time unit, this embodiment can further improve a coverage area and/or a throughput of the wireless communications system.

Moreover, because the first maximum transmission power corresponding to the first time unit can reach the transmission capability of the terminal device, the coverage area and/or the throughput of the wireless communications system are/is further improved.

Therefore, optionally, the maximum transmission power determining method may further include the following step.

S405. The terminal device determines, based on the second maximum transmission power, third transmission power for sending information to the network device in the third time unit set via the first radio access technology, and determines, based on the first maximum transmission power, fourth transmission power for sending information to the network device in a fourth time unit set via the first radio access technology, where the fourth time unit set includes the first time unit.

After S405, the terminal device may send an uplink signal to the network device in the second time unit at the third transmission power via the first radio access technology, and send an uplink signal to the network device in the first time unit at the fourth transmission power via the first radio access technology.

A difference between the embodiment shown in FIG. 4 and the embodiment shown in FIG. 3A lies in the following: In the embodiment shown in FIG. 4, the second indication information sent by the network device to the terminal device explicitly indicates only the third time unit set to the terminal device, and a function of the third time unit set is the same as that of the second time unit set in the embodiment shown in FIG. 3A. The fourth time unit set corresponding to the first time unit set in the embodiment shown in FIG. 3A is determined by the terminal device based on the third time unit set, but is not indicated by the second indication information.

In conclusion, the embodiment shown in FIG. 3A and the embodiment shown in FIG. 4 provide two specific implementations in which the network device indicates a time unit to the terminal device.

Figure 5:
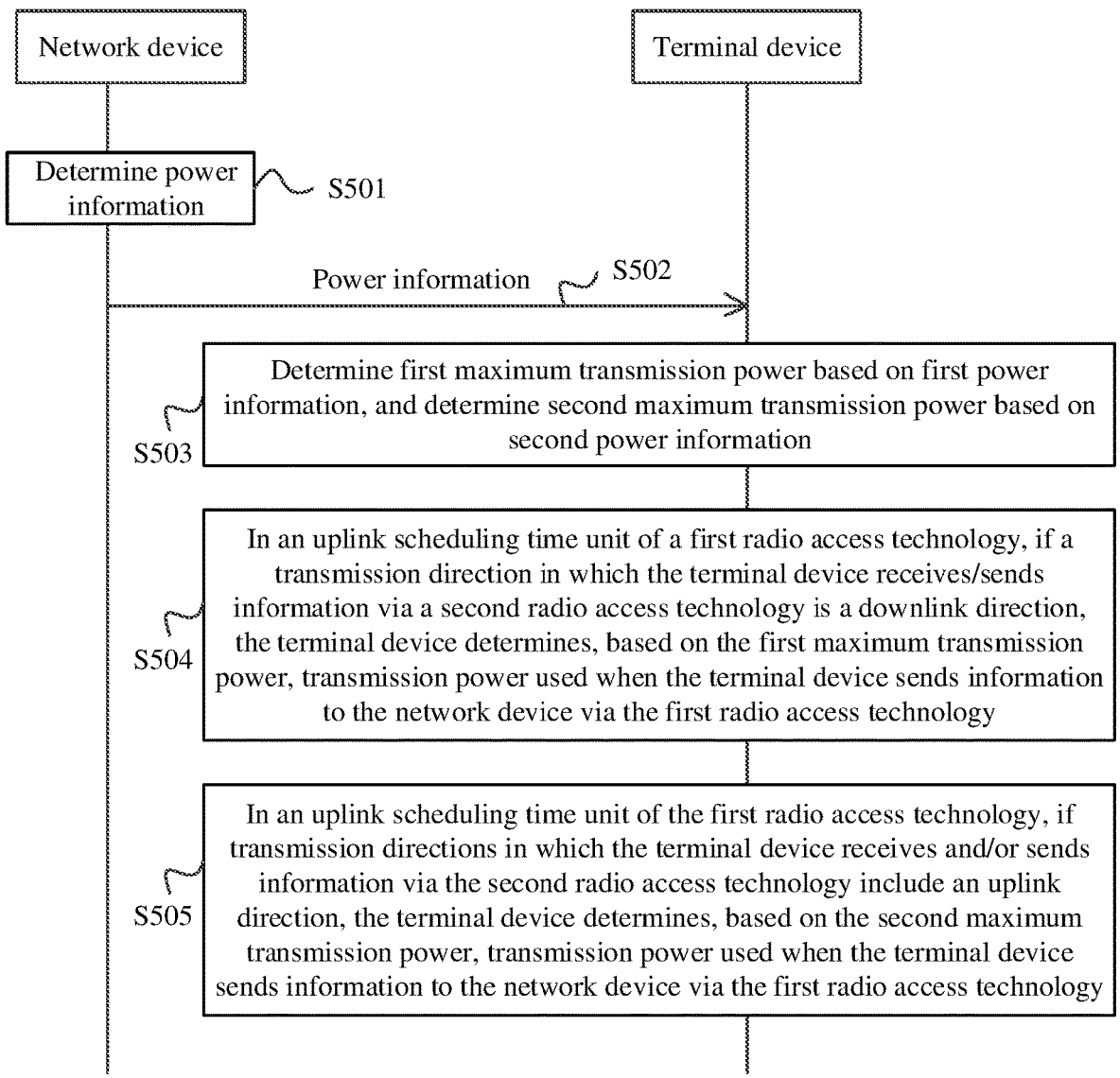
FIG. 5 is a signaling diagram of a maximum transmission power determining method according to still another embodiment of this application.

FIG. 5 is a signaling diagram of a maximum transmission power determining method according to still another embodiment of this application. As shown in FIG. 5, the method in this embodiment may include the following steps.

S501. A network device determines power information.

This step is the same as S201, and details are not described herein again.

S502. The network device sends the power information to a terminal device.

This step is the same as 202, and details are not described herein again.

S503. The terminal device determines the first maximum transmission power based on the first power information, and determines the second maximum transmission power based on the second power information.

This step is the same as S203, and details are not described herein again.

Because the terminal device supports the DC mode, and may receive and send information via a first radio access technology and a second radio access technology at the same time. In this way, from a perspective of the terminal device, in an uplink scheduling time unit of the first radio access technology (it may be understood that in this case, a transmission direction in which the terminal device receives/sends information via the first radio access technology is an uplink direction), transmission directions in which information is received and sent via the second radio access technology may be distinguished in the following several scenarios:

Scenario 1: A transmission direction in which information is received/sent via the first radio access technology is an uplink direction, and a transmission direction in which information is received/sent via the second radio access technology is a downlink direction. In this scenario, in a process in which the terminal device sends information via the first radio access technology, the terminal device only receives information via the second radio access technology.

Scenario 2: A transmission direction in which information is received/sent via the first radio access technology is an uplink direction, and transmission directions in which information is received and/or sent via the second radio access technology include an uplink direction. In this scenario, in a process in which the terminal device sends an uplink signal via the first radio access technology, the terminal device further sends information via the second radio access technology. In other words, an uplink scheduling time unit of the first radio access technology at least partially overlaps an uplink scheduling time unit of the second radio access technology, and "at least partially overlap" may include "completely overlap".

For the scenario 1, the maximum transmission power determining method may further include the following step.

S504. In an uplink scheduling time unit of the first radio access technology, if a transmission direction in which the terminal device receives/sends information via the second radio access technology is a downlink direction, the terminal device determines, based on the first maximum transmission power, transmission power for the terminal device sending information to the network device by the first radio access technology.

It should be noted that the uplink scheduling time unit is a most basic time unit in uplink scheduling, and a first time unit and a second time unit each include uplink scheduling time units. It may be understood that in the first time unit and/or the second time unit, the uplink scheduling time units may be consecutive or nonconsecutive.

For the scenario 2, the maximum transmission power determining method may further include the following step.

S505. In an uplink scheduling time unit of the first radio access technology, if transmission directions in which the terminal device receives and/or sends information via the second radio access technology include an uplink direction, the terminal device determines, based on the second maximum transmission power, transmission power for the terminal device sending information to the network device by the first radio access technology.

It may be understood that, in the scenario 1, the transmission power used when the terminal device sends information to the network device via the first radio access technology may reach a transmission capability of the terminal device. Therefore, the first maximum transmission power may reach the transmission capability of the terminal device. In the scenario 2, a sum of transmission power used when the terminal device sends information to the network device via the first radio access technology and transmission power used when the terminal device sends information to the network device via the second radio access technology may reach the transmission capability of the terminal device. Therefore, the second maximum transmission power can only be less than the transmission capability of the terminal device. Therefore, in this embodiment of this application, it may be set that the first maximum transmission power is greater than the second maximum transmission power.

It should be further noted that the embodiments corresponding to the scenario 1 and the scenario 2 may be independent of each other, that is, only S501, S502, S503, and S504 are included, or only S501, S502, S503, and S505 are included.

Optionally, the first power information and the second power information are power information configured for a same cell, or power information configured for a same carrier.

Figure 6:
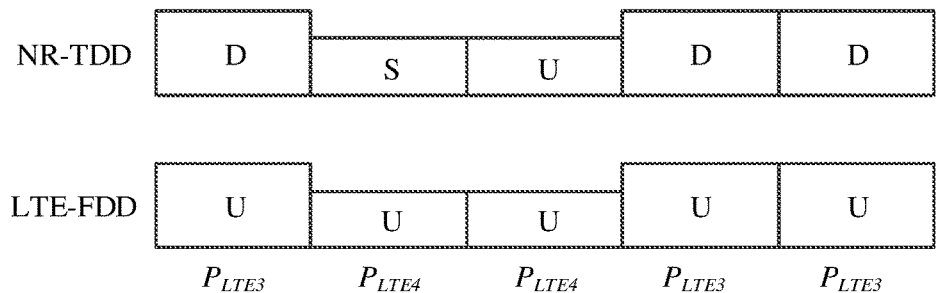
FIG. 6 is a diagram of an application example of a maximum transmission power determining method according to another embodiment of this application.

For example, the terminal device accesses a network via an LTE technology and an NR technology. In an uplink scheduling time unit based on the LTE technology, for example, in a subframe (sub-frame), when a transmission direction on an NR side (the terminal device receives/sends information via the NR technology) is a downlink direction, the terminal device determines, based on the first power information, transmission power $P_{LTE3}$ used when the terminal device sends information to the network device via the LTE technology, as shown in FIG. 6. In an uplink scheduling time unit based on the LTE technology, for example, in a subframe (sub-frame), when there is an uplink direction in transmission directions on the NR side (the terminal device receives and/or sends information via the NR technology), the terminal device determines, based on the second power information, transmission power $P_{LTE4}$ used when the terminal device sends information to the network device via the LTE technology, as shown in FIG. 6. Referring to FIG. 6, "D" represents a downlink subframe; "U" represents an uplink subframe; and "S" represents a special subframe, that is, a subframe in which uplink-downlink switching occurs. $P_{LTE3}$ and $P_{LTE4}$ are transmission power of the terminal device on the LTE side in the uplink scheduling time units. In this example, $P_{LTE4}$ is less than $P_{LTE3}$. NR is deployed in TDD, and LTE is deployed in FDD.

Alternatively, the terminal device accesses a network via an LTE technology and an NR technology. In an uplink scheduling time unit based on the LTE technology, for example, in a subframe (sub-frame), when a transmission direction on an NR side (the terminal device receives/sends information via the NR technology) is a downlink direction, the terminal device determines, based on the first power information, transmission power used when the terminal device sends information to the network device via the LTE technology, as shown in FIG. 6. In an uplink scheduling time unit based on the LTE technology, for example, in a subframe (sub-frame), when there is an uplink direction in transmission directions on the NR side (the terminal device receives and/or sends information via the NR technology), the terminal device determines, based on the first power information and the second power information, transmission power $P_{LTE4}$ used when the terminal device sends information to the network device via the LTE technology, as shown in FIG. 6.

In addition, it can be learned, from the foregoing analysis, that neither of maximum transmission power that is set on the LTE side and maximum transmission power that is set on the NR side in the prior art can reach $P_{cmax}$. Therefore, a coverage area and/or a throughput of a wireless communications system are/is affected. However, in the foregoing embodiment of this application, when an uplink scheduling unit corresponding to the LTE side completely overlaps a downlink scheduling unit corresponding to the NR side, uplink transmission can be performed via $P_{cmax}$ on the LTE side. Transmission directions in which information is received and sent on the NR side are distinguished, to configure maximum transmission power on the LTE side for the terminal device, so that transmission power of the terminal device is more fully used when the transmission power of the terminal device does not exceed the transmission capability of the terminal device. To be specific, during non-simultaneous uplink sending, transmission power used when the terminal device sends information to the network device via the first radio access technology may be higher, thereby improving a coverage area and/or a throughput of a wireless communications system.

In conclusion, when the uplink scheduling time unit of the first radio access technology completely overlaps a downlink scheduling time unit of the second radio access technology, maximum power used when the terminal device sends information via the first radio access technology can reach the transmission capability of the terminal device. Transmission directions in which the terminal device receives and sends information via the second radio access technology are distinguished, to configure, for the terminal device, maximum transmission power used when the terminal device sends information via the first radio access technology, so that transmission power of the terminal device is more fully used when the transmission power of the terminal device does not exceed the transmission capability of the terminal device. To be specific, during non-simultaneous uplink sending, transmission power used when the terminal device sends information to the network device via the first radio access technology may be higher, thereby improving a coverage area and/or a throughput of a wireless communications system.

Figure 7:
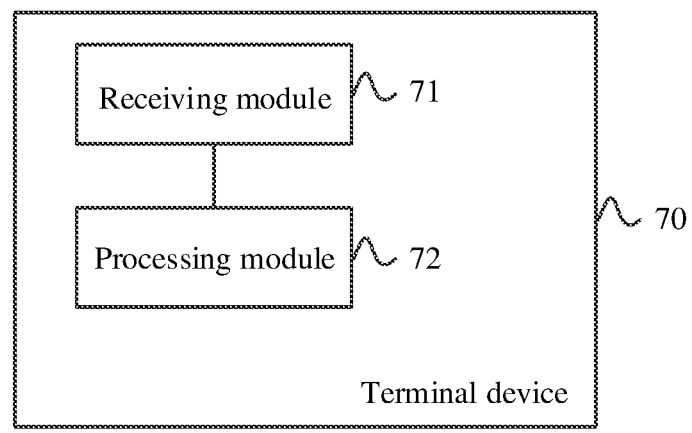
FIG. 7 is a schematic structural diagram of a terminal device according to an embodiment of this application.

FIG. 7 is a schematic structural diagram of a terminal device according to an embodiment of this application. As shown in FIG. 7, the terminal device 70 includes a receiving module 71 and a processing module 72.

The receiving module 71 is configured to receive power information sent by a network device. The power information includes first power information and second power information.

The processing module 72 is configured to: determine first maximum transmission power based on the first power information, and determine second maximum transmission power based on the second power information.

Alternatively, the processing module 72 is configured to: determine first maximum transmission power based on the first power information, and determine second maximum transmission power based on the first power information and the second power information.

The first maximum transmission power is maximum transmission power used when the terminal device 70 sends information to the network device in a first time unit via a first radio access technology, and the second maximum transmission power is maximum transmission power used when the terminal device 70 sends information to the network device in a second time unit via the first radio access technology.

The terminal device in this embodiment may be configured to perform the steps performed by the terminal device in the maximum transmission power determining method provided in the foregoing embodiments. Specific implementation principles and technical effects are similar, and details are not described herein again.

Based on the foregoing embodiment, in an implementation, the receiving module 71 may be further configured to receive first indication information sent by the network device. The first indication information indicates a first time unit set and a second time unit set. The first time unit set includes the first time unit, and the second time unit set includes the second time unit.

Optionally, the processing module 71 may be further configured to: determine, based on the first maximum transmission power, first transmission power for sending information to the network device in the first time unit via the first radio access technology; and determine, based on the second maximum transmission power, second transmission power for sending information to the network device in the second time unit via the first radio access technology.

In another implementation, the receiving module 71 may be further configured to receive second indication information sent by the network device. The second indication information indicates the third time unit set, and the third time unit set includes the second time unit.

Optionally, the processing module 72 may be further configured to: determine, based on the second maximum transmission power, third transmission power for sending information to the network device in the third time unit set via the first radio access technology; and determine, based on the first maximum transmission power, fourth transmission power for sending information to the network device in a fourth time unit set via the first radio access technology. The fourth time unit set includes the first time unit.

Based on the foregoing embodiment, the processing module 72 may be further configured to: in an uplink scheduling time unit of the first radio access technology, if a transmission direction in which the terminal device 70 receives/sends information via a second radio access technology is a downlink direction, determine, based on the first maximum transmission power, transmission power used when the terminal device 70 sends information to the network device via the first radio access technology.

Further, the processing module 72 may be further configured to: in an uplink scheduling time unit of the first radio access technology, if transmission directions in which the terminal device 70 receives and/or sends information via the second radio access technology include an uplink direction, determine, based on the second maximum transmission power, transmission power used when the terminal device 70 sends information to the network device via the first radio access technology.

Figure 8:
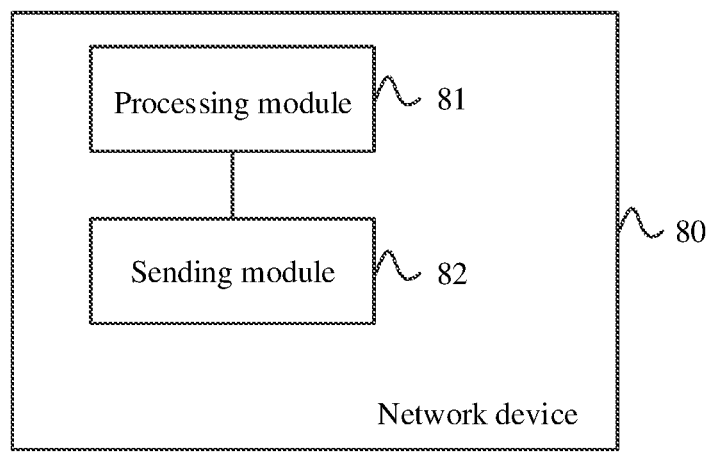
FIG. 8 is a schematic structural diagram of a network device according to an embodiment of this application.

FIG. 8 is a schematic structural diagram of a network device according to an embodiment of this application. As shown in FIG. 8, the network device 80 includes a processing module 81 and a sending module 82.

The processing module 81 is configured to determine power information.

The sending module 82 is configured to send the power information to a terminal device.

The power information includes first power information and second power information. The first power information indicates the terminal device to determine first maximum transmission power, and the second power information indicates the terminal device to determine second maximum transmission power, or the first power information and the second power information jointly indicate the terminal device to determine second maximum transmission power. The first maximum transmission power is maximum transmission power used when the terminal device sends information to the network device 80 in a first time unit via a first radio access technology, and the second maximum transmission power is maximum transmission power used when the terminal device sends information to the network device 80 in a second time unit via the first radio access technology.

The network device in this embodiment may be configured to perform the steps performed by the network device in the maximum transmission power determining method provided in the foregoing embodiments. Specific implementation principles and technical effects are similar, and details are not described herein again.

Based on the foregoing embodiment, in an implementation, the sending module 82 may be further configured to send first indication information to the terminal device. The first indication information indicates a first time unit set and a second time unit set. The first time unit set includes the first time unit, and the second time unit set includes the second time unit.

In another implementation, the sending module 82 may be further configured to send second indication information to the terminal device. The second indication information indicates the third time unit set, and the third time unit set includes the second time unit.

Optionally, in an uplink scheduling time unit of the first radio access technology, if a transmission direction in which the terminal device receives/sends information via a second radio access technology is a downlink direction, the first power information may further indicate the terminal device to determine, based on the first maximum transmission power, transmission power used when the terminal device sends information to the network device 80 via the first radio access technology; and Optionally, in an uplink scheduling time unit of the first radio access technology, if transmission directions in which the terminal device receives and/or sends information via the second radio access technology include an uplink direction, the second power information may further indicate the terminal device to determine, based on the second maximum transmission power, transmission power used when the terminal device sends information to the network device via the first radio access technology.

Optionally, in an uplink scheduling time unit of the first radio access technology, if transmission directions in which the terminal device receives and/or sends information via the second radio access technology include an uplink direction, the first power information and the second power information further jointly indicate the terminal device to determine, based on the first maximum transmission power and the second maximum transmission power, transmission power used when the terminal device sends information to the network device 8*o* via the first radio access technology.

Figure 9:
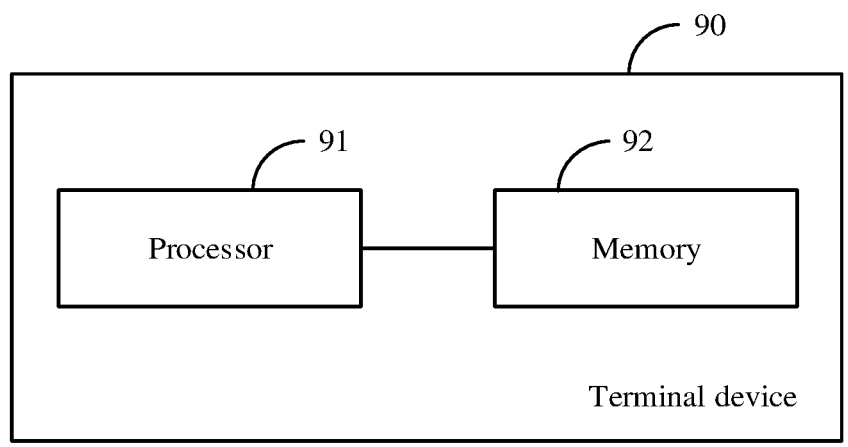
FIG. 9 is a schematic structural diagram of a terminal device according to another embodiment of this application.

The terminal device in the embodiments of this application may be a terminal device 90 shown in FIG. 9.

As shown in FIG. 9, the terminal device 90 includes a processor 91 and a memory 92. The memory 92 is configured to store an instruction. When the processor 91 executes the instruction stored in the memory 92, the terminal device go performs related method steps performed by the terminal device in any method embodiment of this application.

Optionally, the terminal device 90 may further include a transceiver (not shown). The processor 91, the memory 92, and the transceiver (which may include a transmitter and a receiver) are connected to each other.

For detailed descriptions of the modules in the terminal device 90 provided in this embodiment of this application and technical effects brought after the modules perform the related method steps performed by the terminal device in any method embodiment of this application, refer to the related descriptions in the method embodiment of this application. Details are not described herein again.

Figure 10:
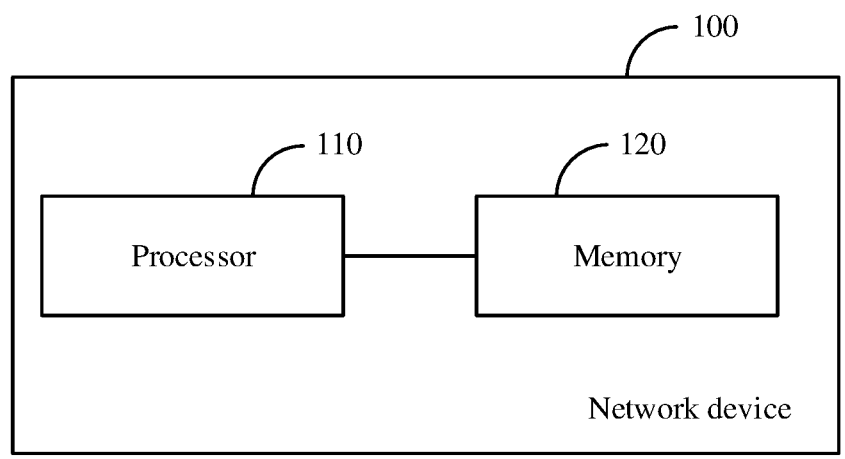
FIG. 10 is a schematic structural diagram of a network device according to another embodiment of this application.

The network device in the embodiments of this application may be a network device 100 shown in FIG. 10.

As shown in FIG. 10, the network device 100 includes a processor 110 and a memory 120. The memory 120 is configured to store an instruction. When the processor 110 executes the instruction stored in the memory 120, the network device 100 performs related method steps performed by the network device in any method embodiment of this application.

Optionally, the network device 100 may further include a transceiver (not shown). The processor 110, the memory 120, and the transceiver (which may include a transmitter and a receiver) are connected to each other.

For detailed descriptions of the modules or units in the network device 100 provided in this embodiment of this application and technical effects brought after the modules or units perform the related method steps performed by the network device in any method embodiment of this application, refer to the related descriptions in the method embodiment of this application. Details are not described herein again.

An embodiment of this application provides a network device. The network device has a function of implementing behavior of the network device in any one of the foregoing method embodiments. The function may be implemented by hardware, or may be implemented by hardware executing corresponding software. The hardware or the software includes one or more modules corresponding to the foregoing functions. Optionally, the network device may be a base station.

An embodiment of this application provides a terminal device, including at least one processing element (or chip) configured to perform the method procedure related to the terminal device in any one of the foregoing method embodiments.

An embodiment of this application provides a network device, including at least one processing element (or chip) configured to perform the method procedure related to the network device in any one of the foregoing method embodiments.

An embodiment of this application provides a terminal device. The terminal device has a function of implementing behavior of the terminal device in any one of the foregoing method embodiments. The function may be implemented by hardware, or may be implemented by hardware executing corresponding software. The hardware or the software includes one or more modules corresponding to the foregoing functions.

An embodiment of this application further provides a communications system. The system includes the network device and the terminal device in any one of the foregoing embodiments.

An embodiment of this application further provides a chip, including a processing module and a communications interface. The processing module can perform the method procedure related to the terminal device in any one of the foregoing method embodiments. Further, the chip further includes a storage module (for example, a memory), and the storage module is configured to store an instruction. The processing module is configured to execute the instruction stored in the storage module, and execution of the instruction stored in the storage module enables the processing module to perform the method procedure related to the terminal device in any one of the foregoing method embodiments.

According to a sixteenth aspect, an embodiment of this application provides a chip, including a processing module and a communications interface. The processing module can perform the method procedure related to the network device in any one of the foregoing method embodiments. Further, the chip further includes a storage module (for example, a memory), and the storage module is configured to store an instruction. The processing module is configured to execute the instruction stored in the storage module, and execution of the instruction stored in the storage module enables the processing module to perform the method procedure related to the network device in any one of the foregoing method embodiments.

An embodiment of this application provides a computer-readable storage medium. When an instruction in the computer-readable storage medium is executed by a processor of a terminal device, the terminal device is enabled to implement the method procedure related to the terminal device in any one of the foregoing method embodiments.

An embodiment of this application provides a computer-readable storage medium. When an instruction in the computer-readable storage medium is executed by a processor of a network device, the network device is enabled to implement the method procedure related to the network device in any one of the foregoing method embodiments.

An embodiment of this application provides a program or a computer program product including a program. When the program is executed by a processor of a terminal device, the terminal device is enabled to implement the method procedure related to the terminal device in any one of the foregoing method embodiments.

An embodiment of this application provides a program or a computer program product including a program. When the program is executed by a processor of a network device, the network device is enabled to implement the method procedure related to the network device in any one of the foregoing method embodiments.

It should be understood that, the processor mentioned in the embodiments of this application may be a central processing unit (CPU), or may be another general-purpose processor, a digital signal processor (DSP), an application-specific integrated circuit (ASIC), a field programmable gate array (FPGA) or another programmable logical device, a discrete gate or a transistor logical device, a discrete hardware component, or the like. The general-purpose processor may be a microprocessor, or the processor may be any conventional processor or the like.

It may be further understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. By way of example and not limitation, many forms of RAMs may be used, for example, a static random access memory (Static RAM, SRAM), a dynamic random access memory (DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that the memory described in this specification is intended to include but is not limited to these and any memory of another proper type.

It should be further understood that "first", "second", and various serial numbers in this specification are merely for purpose of distinction for ease of description, but are not intended to limit the scope of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. Some or all steps may be performed in parallel or in sequence. The execution sequences of the processes should be determined based on functions and internal logic of the processes, but should not constitute any limitation on an implementation process of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or a terminal device) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

Related parts between the method embodiments of this application may be mutually referenced. The apparatus provided in each apparatus embodiment is configured to perform the method provided in the corresponding method embodiment. Therefore, each apparatus embodiment may be understood with reference to a related part in a related method embodiment.

A structural diagram of the apparatus in each apparatus embodiment of this application merely show a simplified design of the apparatus. In actual application, the apparatus may include any quantity of transmitters, receivers, processors, memories, and the like, to implement functions or operations performed by the apparatus in each apparatus embodiment of this application. All apparatuses that can implement this application fall within the protection scope of this application.

A name of a message/a frame/indication information, a module, a unit, or the like provided in each embodiment of this application is merely an example, and other names may be used, provided that a function of the message/the frame/the indication information, the module, the unit, or the like remains unchanged.

The terms used in the embodiments of this application are merely for the purpose of illustrating specific embodiments, and are not intended to limit this application. The terms "a", "said" and "the" of singular forms used in the embodiments and the appended claims of this application are also intended to include plural forms, unless otherwise specified in the context clearly.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

A person of ordinary skill in the art may understand that all or some of the steps of the method in the foregoing embodiments may be implemented by a program instructing related hardware. The program may be stored in a readable storage medium of a device, such as a FLASH or an EEPROM. When the program is executed, the program performs all or some of the steps described above.

In the foregoing specific implementations, the objective, technical solutions, and benefits of this application are further described in detail. It should be understood that different embodiments can be combined. The foregoing descriptions are merely specific implementations of this application, but are not intended to limit the protection scope of this application. Any combination, modification, equivalent replacement, or improvement made without departing from the spirit and principle of this application should fall within the protection scope of this application.

What is claimed is:

1. A method, comprising:
   receiving, by a terminal device from a network device, first power information and second power information;
   sending, by the terminal device based on a first maximum transmission power, information to the network device using a first radio access technology in a time unit, wherein a transmission direction of the time unit in which the terminal device communicates using a second radio access technology is a downlink direction, and the first maximum transmission power is based on the first power information; and
   when an uplink time unit scheduled according to the first radio access technology overlaps with an uplink time unit scheduled according to the second radio access technology, sending, by the terminal device, information to the network device using the first radio access technology based on a second maximum transmission power, wherein the second maximum transmission power is based on the second power information.

2. The method according to claim 1, wherein the first maximum transmission power is larger than the second maximum transmission power.

3. The method according to claim 1, wherein the first power information and second power information are carried by semi-statically configured higher layer signaling.

4. The method according to claim 1, wherein the first radio access technology is a long term evolution (LTE) technology, and the second radio access technology is a new radio (NR) technology.

5. The method according to claim 1, further comprising:
   determining, by the terminal device, the first maximum transmission power based on the first power information, and
   determining the second maximum transmission power based on the second power information.

6. A method, comprising:
   determining, by a network device, first power information and second power information; and
   sending, by the network device to a terminal device, the first power information and the second power information, wherein:
   the first power information indicates to the terminal device to determine a first maximum transmission power, and the second power information indicates to the terminal device to determine a second maximum transmission power;
   the first maximum transmission power is used when the terminal device sends information to the network device in a time unit using a first radio access technology, and a transmission direction of the time unit in which the terminal device receives or sends information using a second radio access technology is a downlink direction; and
   when an uplink time unit scheduled according to the first radio access technology overlaps with an uplink time unit scheduled according to the second radio access technology, the second maximum transmission power is used when the terminal device sends information to the network device using the first radio access technology.

7. The method according to claim 6, wherein the first maximum transmission power is larger than the second maximum transmission power.

8. The method according to claim 6, wherein the first power information and second power information are carried by semi-statically configured higher layer signaling.

9. The method according to claim 6, wherein the first radio access technology is a long term evolution (LTE) technology, and the second radio access technology is a new radio (NR) technology.

10. A terminal device, comprising:
a receiver, configured to receive, from a network device, first power information and second power information; and
a transmitter, configured to:
send, based on a first maximum transmission power, information to the network device in a time unit using a first radio access technology, wherein a transmission direction of the time unit in which the terminal device receives or sends information using a second radio access technology is a downlink direction, and the first maximum transmission power is based on the first power information; and
when an uplink time unit scheduled according to the first radio access technology overlaps with an uplink time unit scheduled according to the second radio access technology, send information to the network device using the first radio access technology and based on a second maximum transmission power, wherein the second maximum transmission power is based on the second power information.

11. The terminal device according to claim 10, wherein the first maximum transmission power is larger than the second maximum transmission power.

12. The terminal device according to claim 10, wherein the first power information and second power information are carried by semi-statically configured higher layer signaling.

13. The terminal device according to claim 10, wherein the first radio access technology is a long term evolution (LTE) technology, and the second radio access technology is a new radio (NR) technology.

14. The terminal device according to claim 10, further comprising:
a processor, configured to determine the first maximum transmission power based on the first power information, and determine the second maximum transmission power based on the second power information.

15. A network device, comprising:
a processor, configured to determine first power information and second power information; and
a transmitter, configured to send, to a terminal device, the first power information and the second power information; wherein:
the first power information indicates to the terminal device to determine first maximum transmission power, and the second power information indicates to the terminal device to determine second maximum transmission power;
the first maximum transmission power is used when the terminal device sends information to the network device in a time unit using a first radio access technology, wherein a transmission direction of the time unit in which the terminal device receives or sends information using a second radio access technology is a downlink direction; and
when an uplink time unit scheduled according to the first radio access technology overlaps with an uplink time unit scheduled according to the second radio access technology, the second maximum transmission power is used when the terminal device sends information to the network device using the first radio access technology.

16. The network device according to claim 15, wherein the first maximum transmission power is larger than the second maximum transmission power.

17. The network device according to claim 15, wherein the first power information and second power information are carried by semi-statically configured higher layer signaling.

18. The network device according to claim 15, wherein the first radio access technology is a long term evolution (LTE) technology, and the second radio access technology is an new radio (NR) technology.

19. A non-transitory computer-readable medium having processor-executable instructions stored thereon, wherein the processor-executable instructions, when executed, cause a device to execute operations comprising:
receiving, from a network device, first power information and second power information;
sending, based on a first maximum transmission power, information to the network device using a first radio access technology in a time unit, wherein:
a transmission direction of the time unit in which a terminal device receives or sends information using a second radio access technology is a downlink direction, and the first maximum transmission power is based on the first power information; and
when an uplink time unit scheduled according to the first radio access technology overlaps with uplink time unit scheduled according to the second radio access technology, sending information to the network device using the first radio access technology based on a second maximum transmission power, wherein the second maximum transmission power is based on the second power information.

20. A non-transitory computer-readable medium having processor-executable instructions stored thereon, wherein the processor-executable instructions, when executed, cause a device to execute operations comprising:
determining first power information and second power information; and
sending the first power information and the second power information to a terminal device, wherein:
the first power information indicates to the terminal device to determine a first maximum transmission power, and the second power information indicates to the terminal device to determine a second maximum transmission power;
the first maximum transmission power is used when the terminal device sends information to a network device in a time unit using a first radio access technology, wherein a transmission direction of the time unit in which the terminal device receives or sends information using a second radio access technology is a downlink direction; and
when an uplink time unit scheduled according to the first radio access technology overlaps with an uplink time unit scheduled according to the second radio access technology, the second maximum transmission power is used when the terminal device sends information to the network device using the first radio access technology.

\* \* \* \* \*